United States Patent

Adams, IV

[15] 3,696,821
[45] Oct. 10, 1972

[54] DEVICE FACILITATING USE OF DENTAL FLOSS

[72] Inventor: John Q. Adams, IV, 1206 Foxcroft Road, Richmond, Va. 23229

[22] Filed: Oct. 14, 1971

[21] Appl. No.: 189,082

[52] U.S. Cl. .................................................132/91
[51] Int. Cl. ............................................A61c 15/00
[58] Field of Search .......132/91, 92, 89, 90; 223/101

[56] References Cited

UNITED STATES PATENTS

| | | | |
|---|---|---|---|
| 1,966,463 | 7/1934 | Rose | 132/92 R |
| 2,415,957 | 2/1947 | McCormack | 223/101 |
| 2,447,774 | 9/1948 | Salisbury | 223/101 |

Primary Examiner—Louis G. Mancene
Assistant Examiner—J. Q. Lever
Attorney—B. P. Fishburne, Jr.

[57] ABSTRACT

A pair of caps or thimbles engage over two fingers of the user and the closed ends of the thimbles are apertured to allow feeding of the dental floss from a supply container as required to clean the teeth. The thimbles frictionally clamp the dental floss to the fingers so that the floss may be properly tensioned for use without the inconvenience and frequent discomfort which arises when the dental floss must be wound around the finger tips. The device is efficient and economical.

8 Claims, 4 Drawing Figures

PATENTED OCT 10 1972

3,696,821

INVENTOR
JOHN Q. ADAMS, IV

BY B. P. Fishburn, Jr.
ATTORNEY

DEVICE FACILITATING USE OF DENTAL FLOSS

Modern-day dentists increasingly advocate the daily use of dental floss for maintaining healthy teeth and gums. Despite the strong recommendation of dentists, dental floss is rarely used by the public even though most people are very conscious of a dental hygiene program. The reason behind the seeming reluctance to use dental floss regularly is apparently the inconvenience of using it plus the fact that its proper use requires some elemental skill which the average person is unwilling to take the time to acquire. When properly used, dental floss can greatly promote the health of teeth and gums by dislodging food particles near the gums which a toothbrush almost never reaches.

To successfully use dental floss between all of the teeth, the floss must be tensioned to a considerable degree and forced between each pair of teeth. To accomplish this, the user customarily coils the floss around two finger tips, usually the index fingers, and then employs the thumbs to grip the ends of the floss and applies the necessary tension. This can be very uncomfortable and painful to the fingers and will cut off blood circulation during the course of a complete tooth cleaning operation.

Certain mechanical devices to aid in the use of the floss have been proposed in the prior art, such as forked holders having a handle, with some means to anchor the floss across the tips of the fork. These devices are not popular for a number of reasons. First, they are bulky and difficult to manipulate in the mouth. In short, they are very awkward. Additionally, most people will not take the time to utilize an instrument which must be threaded, tensioned and manipulated each time a new section of floss is required.

With the above in mind, the present invention has for its object the provision of an extremely simple device or aid to facilitate and promote the daily use of dental floss in the proper manner and without discomfort at the finger tips or inconvenience to the user. The device is so simple and economical that the dental floss manufacturer can well afford to supply it at no extra cost with an ordinarily household package of floss. Additionally, the dentist should find the device useful and time-saving in regular teeth-cleaning operations. The device requires no skill or practice and is very efficient.

Other objects and advantages of the invention will become apparent during the course of the following description.

BRIEF DESCRIPTION OF DRAWING FIGURES

BRIEF DESCRIPTION

Figure 1:
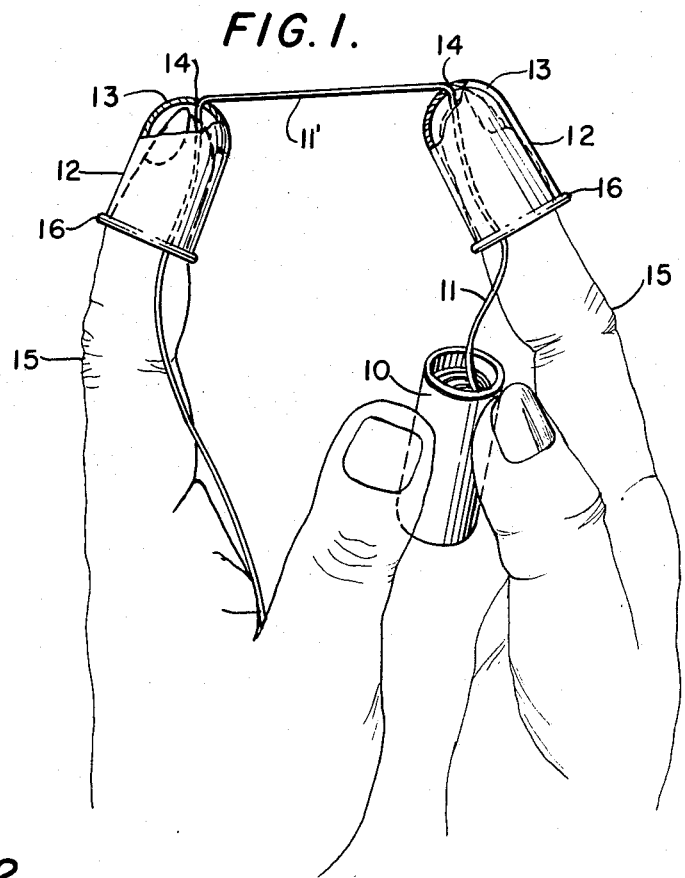
FIG. 1 is a perspective view of a dental floss manipulating aid or device embodying the invention.
Figure 2:
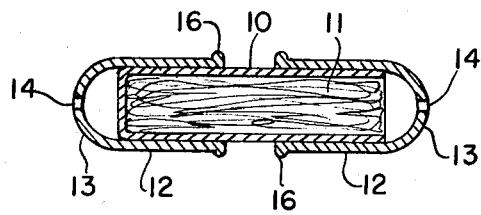
FIG. 2 is a vertical sectional view of the device in assembled relationship with a dental floss container.
Figure 3:
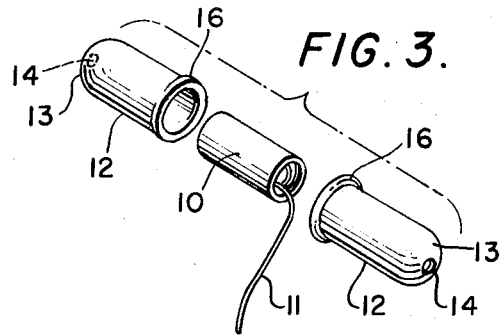
FIG. 3 is an exploded perspective view of the device in relation to the container and dental floss.

Referring to the drawings in detail, wherein like reference numerals designate like parts, the numeral 10 designates an ordinary cylindrical container for dental floss 11. The manipulating device or aid for using dental floss embodying the present invention comprises an identical pair of generally cylindrical thimbles or caps 12 adapted to engage snugly over the fingers, as shown in FIG. 1, and also adapted to be placed telescopically and removably over the opposite ends of the container 10 for convenience and to prevent the parts from becoming lost. The thimbles 12 have their closed ends spherically rounded as shown at 13 and each thimble is provided centrally in its rounded end with a small guide aperture 14 for the dental floss 11. Preferably, the thimbles 12 are of sufficient length to extend over and somewhat beyond the first knuckle of the index finger and the thimbles may be longer and may extend close to the second knuckle 15, if desired. The thimbles 12 are preferably rigid and may be formed of metal, plastic or the like. In some cases, semi-rigid plastic material may be suitable.

In use, the thimbles 12 are removed from the container 10 and a length of the floss 11 is withdrawn from the container and threaded through the apertures 14 of the thimbles, as shown in FIG. 1. The two thimbles are then applied snugly over the two index fingers in most cases and the necessary tension is applied to the section of floss 11' between the two thimbles to permit its efficient use in tooth cleaning. The frictional engagement between the dental floss, thimbles and the fingers will allow a rather high degree of tension to be exerted on the floss without slippage and it is unnecessary to wrap or coil the dental floss around the fingers or around the thimbles during usage. However, should additional tension ever be required in unusual cases, the floss could be coiled around the thimbles 12 externally and clamped thereagainst by the thumbs during use to positively assure no slippage. The floss 11 may be severed from the supply in the container 10 during usage, as desired.

When it is necessary to adjust the floss so as to present a fresh section for usage, the two thimbles may simply be loosened on the fingers and the floss may be pulled from the container through the two guide openings 14. These two small openings also assist in the tensioning of the section 11' during usage since they apply a high degree of friction to the floss at the points where the floss changes directions when leading from one thimble to the other.

A small amount of practice will enable the user to employ the dental floss much more conveniently, more economically and with more personal comfort than would be the case were the aid not used. The use of the aid or device will also render the cleaning of teeth more complete and more efficient and will lessen the wasting of dental floss which frequently occurs in practice because the floss tends to slip in the fingers when it is wet and impatient users tend to pull off unnecessarily large amounts of floss to wrap around the fingers.

It should also be mentioned that the thimble elements 12 are preferably flanged at 16 adjacent their open ends to provide additional surfaces against which the severed ends of the floss strand may be pressed by the thumbs to increase friction and prevent slippage of the floss. The ends of the floss may be clamped by the two thumbs anywhere against the outer surfaces of the two thimbles.

Figure 4:
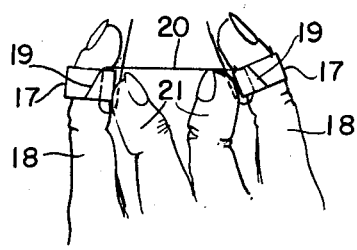
FIG. 4 is a fragmentary perspective view of a modification of the invention.

In FIG. 4, a somewhat simplified embodiment of the invention is shown wherein a pair of split bands or rings 17 are applied over the two index fingers 18 of the user near the finger tips. The bands 17 are preferably split as indicated at 19 to permit adjusting their diameters to fit various sizes of fingers. The dental floss strand 20 being manipulated has its ends extended between the fingers 18 and the bores of the bands 17, and the thumbs 21 may then be used as shown to securely clamp the free ends of the floss strand against the outer sides of the two bands 17 to prevent slippage.

It is believed that the advantages of the invention and its mode of use should now be clearly apparent without the necessity for further explanation.

It is to be understood that the form of the invention herewith shown and described is to be taken as a preferred example of the same, and that various changes in the shape, size and arrangement of parts may be resorted to, without departing from the spirit of the invention or scope of the subjoined claims.

I claim:

1. A means to facilitate and promote the use of dental floss for cleaning the teeth comprising the combination of a pair of thimble elements and dental floss, said thimble elements being engageable snugly over the ends of fingers of the user, each thimble element having a small guide aperture for a strand of dental floss formed through its closed end, whereby the dental floss strand may be extended and tensioned between the two thimble elements, the dental floss being frictionally held between the bores of the thimble elements and the two fingers upon which the thimble elements are mounted.

2. The structure of claim 1, and the two thimble elements being substantially rigid generally cylindrical bodies having rounded closed ends and said small guide apertures being formed centrally through the rounded ends.

3. The structure of claim 2, and said thimble elements being of sufficient length to extend over at least the first knuckles of the two fingers on which they are mounted during use.

4. The structure of claim 3, and the thimble elements being externally flanged at their inner ends to provide surfaces against which opposite extended ends of dental floss may be clamped by the thumbs during usage.

5. The structure of claim 1, and a substantially cylindrical container of dental floss, the thimble elements being telescopically engageable over the opposite ends of the container during periods of non-use to form a unitary assembly, one of said thimble elements then forming a removable closure cap for the container.

6. A device to facilitate using dental floss for cleaning the teeth comprising a pair of substantially annular elements engageable snugly over two fingers of the user, and a strand of dental floss extending in a taut section between the two annular elements, the arrangement being such that free ends of the floss strand may be engaged by the thumbs of the user and securely clamped against the outer surfaces of the elements to prevent slippage of the strand during use.

7. The structure of claim 6, and said annular elements comprising a pair of bands engageable over said fingers near the tips of the fingers.

8. The structure of claim 7, and said bands being split to render them readily adjustable to fingers of various sizes.

* * * * *